United States Patent
Glass et al.

(10) Patent No.: US 9,770,744 B2
(45) Date of Patent: Sep. 26, 2017

(54) FLAT STEEL PRODUCT WITH HIGH REFLECTIVITY, FLAT STEEL PRODUCT AND MIRROR ELEMENT FOR SOLAR CONCENTRATORS

(71) Applicants: ThyssenKrupp Steel Europe AG, Duisburg (DE); Outokumpu Nirosta GmbH, Krefeld (DE)

(72) Inventors: Roman Glass, Dortmund (DE); Utz Karsten, Mudersbach (DE); Jörg Kazmierski, Siegen (DE); Nina Kolbe, Bochum (DE); Hans-Joachim Krautschick, Solingen (DE); Klaus Manfred Lange, Dusseldorf (DE); Stefan Peter Puls, Dortmund (DE); Janine Schauer-Paβ, Bochum (DE); Bernd Schuhmacher, Dortmund (DE); Dirk Wiemer, Dusseldorf (DE); Frank Wörster, Netphen (DE)

(73) Assignees: ThyssenKrupp Steel Europe AG, Duisburg (DE); Outokumpu Nirosta GmbH, Krefeld (DE)

( * ) Notice: Subject to any disclaimer, the term of this patent is extended or adjusted under 35 U.S.C. 154(b) by 0 days.

(21) Appl. No.: 14/431,613

(22) PCT Filed: Aug. 27, 2013

(86) PCT No.: PCT/EP2013/067701
§ 371 (c)(1),
(2) Date: Mar. 26, 2015

(87) PCT Pub. No.: WO2014/048656
PCT Pub. Date: Apr. 3, 2014

(65) Prior Publication Data
US 2015/0283590 A1 Oct. 8, 2015

(30) Foreign Application Priority Data

Sep. 28, 2012 (DE) .................. 10 2012 109 287
Dec. 27, 2012 (EP) ..................... 12199475

(51) Int. Cl.
*B21B 1/22* (2006.01)
*B21B 45/00* (2006.01)
(Continued)

(52) U.S. Cl.
CPC ............... *B21B 1/222* (2013.01); *B21B 1/28* (2013.01); *B21B 45/004* (2013.01); *C21D 1/26* (2013.01);
(Continued)

(58) Field of Classification Search
CPC ..... Y10T 428/12993; Y10T 428/12951; Y10T 428/12972; Y10T 428/12979; Y10T 428/26; C22C 38/00; C22C 38/18; C22C 38/22; C22C 38/28
See application file for complete search history.

(56) References Cited

U.S. PATENT DOCUMENTS

| 3,556,874 A | 1/1971 | McClain |
| 4,885,042 A | 12/1989 | Kenmochi et al. |

(Continued)

FOREIGN PATENT DOCUMENTS

| CN | 88103090 A | 12/1988 |
| CN | 1134857 A | 11/1996 |

(Continued)

*Primary Examiner* — Michael E La Villa
(74) *Attorney, Agent, or Firm* — The Webb Law Firm

(57) ABSTRACT

A method for producing a flat steel product with high reflectivity, in which at least one surface has an arithmetic mean roughness Ra of less than 0.03 µm includes providing a flat steel product, at least one surface of which has an arithmetic mean roughness Ra of less than 2.5 µm. The flat steel product is cold rolled in a plurality of rolling passes. Also a flat steel product with high reflectivity in the finished re-rolled state on at least one of its surface has a low arithmetic mean roughness, a high gloss, and a high directed reflection. A solar concentrator is produced from such a flat steel product.

6 Claims, 4 Drawing Sheets

Figure 3:
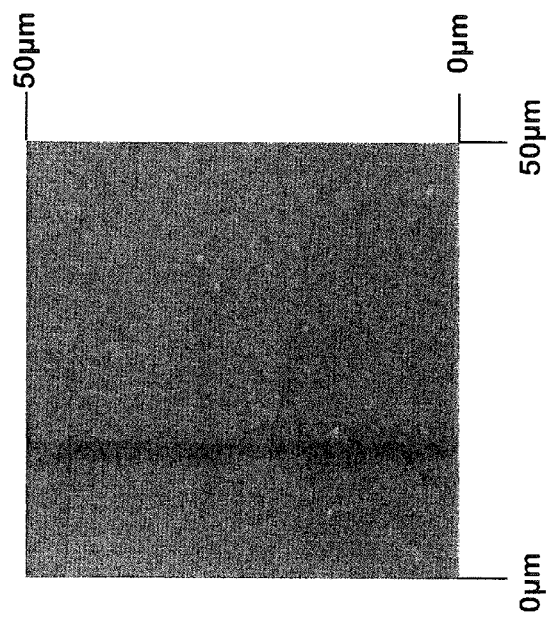

(51) Int. Cl.
    *C21D 1/26*           (2006.01)
    *C21D 8/02*           (2006.01)
    *C21D 9/46*           (2006.01)
    *C22C 38/00*          (2006.01)
    *C22C 38/18*          (2006.01)
    *B21B 1/28*           (2006.01)

(52) U.S. Cl.
    CPC ......... *C21D 8/0236* (2013.01); *C21D 8/0247* (2013.01); *C21D 9/46* (2013.01); *C22C 38/00* (2013.01); *C22C 38/18* (2013.01); *B21B 2001/221* (2013.01); *B21B 2261/14* (2013.01); *B21B 2267/10* (2013.01); *Y02E 10/52* (2013.01); *Y10T 428/12993* (2015.01)

(56) References Cited

U.S. PATENT DOCUMENTS

| | | |
|---|---|---|
| 5,390,518 A | 2/1995 | Morimoto et al. |
| 5,799,527 A | 9/1998 | Kenmochi et al. |
| 5,912,777 A | 6/1999 | Jaworske |
| 5,986,205 A | 11/1999 | Matsune et al. |
| 6,230,534 B1 | 5/2001 | Sato et al. |
| 6,478,899 B1 | 11/2002 | Legrand et al. |
| 2009/0202380 A1* | 8/2009 | Conrad ................ C21D 8/0205 420/49 |

FOREIGN PATENT DOCUMENTS

| | | |
|---|---|---|
| CN | 1291922 A | 4/2001 |
| DE | 19505324 A1 | 8/1996 |
| EP | 0597169 A1 | 5/1994 |
| EP | 0694620 A1 | 1/1996 |
| JP | H01154802 A | 6/1989 |
| JP | 6182402 A | 7/1994 |
| JP | 7155809 A | 6/1995 |
| JP | H09239410 A | 9/1997 |
| JP | 2003311314 A | 11/2003 |
| JP | 2005211975 A | 8/2005 |

* cited by examiner

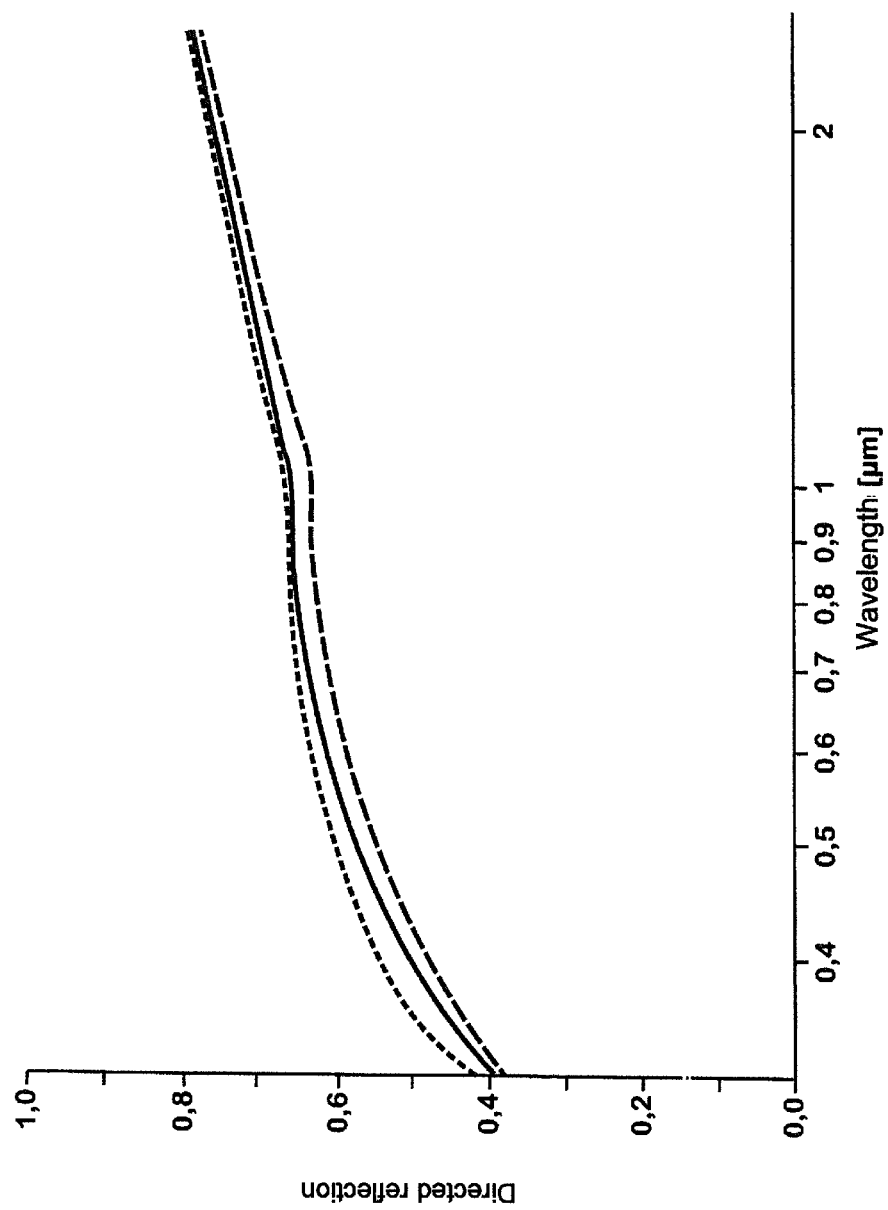

FLAT STEEL PRODUCT WITH HIGH REFLECTIVITY, FLAT STEEL PRODUCT AND MIRROR ELEMENT FOR SOLAR CONCENTRATORS

CROSS-REFERENCE TO RELATED APPLICATIONS

This application is the United States national phase of International Application No. PCT/EP2013/067701 filed Aug. 27, 2013, and claims priority to German Patent Application No. 10 2012 109 287.7 filed Sep. 28, 2012, and European Patent Application No. 12199475.0 filed Dec. 27, 2012, the disclosures of which are hereby incorporated in their entirety by reference.

The invention concerns a method for producing a flat steel product with a high reflectivity within the radiation range of the sun, a flat steel product provided in this way and a mirror element for solar concentrators.

Where flat steel products are referred to here, then unless otherwise stated this means steel strips or steel sheet made from carbon steel, stainless steel or high-grade steel as well as bars, blanks and so on made from these.

Mirror elements of the kind referred to here are for example used in solar thermal technology for gathering the sunlight falling upon them and concentrating this on a pipe or similar through which a heat transfer medium passes. Through the use of such so-called solar concentrators greater efficiency can be achieved in the exploitation of solar power. Here there is a requirement not only for the mirror elements to have an optimum reflectivity within the radiation range of the sun, but such mirror elements should also be resistant to the mechanical stresses arising in use and should be cheap to manufacture.

Mirror elements of the kind referred to here are used in power plant technology, such as for example in parabolic trough, Fresnel, dish-stirling and tower power plants. A common feature of such systems is that the solar radiation has to be concentrated.

Currently glass substrates are used for solar concentrators, which have silver, aluminium and other reflection components vapour-deposited on one side.

Alternatively, it is for example known from U.S. Pat. No. 5,912,777 that flat steel products, which even at temperatures in excess of 500° C. still have a high reflectivity, can be produced by polishing the respective substrate, until the low roughness necessary for a high reflectivity is achieved.

Where the term 'arithmetic mean roughness Ra' is used here, this means the value determined according to DIN EN ISO 4287. For a polished flat steel product surface the arithmetic mean roughness Ra has no distinct preferred direction. Instead, the surface of the polished product has a surface structure characterised by a chaotic alignment of the tool marks left from the polishing.

The effort involved in polishing a flat steel product surface is considerable, since for this not only are specially set up machines used, but a very long machining time has to be expected.

Various attempts have therefore been made to produce high gloss finished steel surfaces without polishing. Thus for example JP 7155809 A, JP 199876109 A or JP 1992340706 A each suggest that the sheets are cold-rolled using high-gloss polished working rolls, the mean roughness Ra of which is in the range 0.01-0.06 µm. However, the surface values that can be provided in this way on a flat steel product achieve an arithmetic mean roughness of at best Ra=0.05 µm. The gloss and the associated reflectivity of a surface provided in this way as a rule are insufficient to meet the high demands that are nowadays placed upon mirror elements produced from such flat steel products.

Against the background of the state of the art outlined above the problem for the invention was one of setting out a method with which it is possible in a cost-effective manner to produce a flat steel product which in the finish-rolled state, i.e. without additional fine machining, such as polishing or grinding, has a reflectivity which makes the flat steel product so produced suitable for producing solar concentrators or other applications in which a high reflectivity for sunlight is required. Likewise, a flat steel product provided in this way and a particularly economical use of such a flat steel product should be set out.

With regard to the method the solution according to the invention to this problem comprises performing the work steps indicated during the production of a flat steel product with a high reflectivity.

A flat steel product according to the invention solving the abovementioned problem has the features indicated, wherein it should be stressed that these features are present in the finish re-rolled, i.e. not further mechanically finely machined, flat steel product.

The method according to the invention is particularly well-suited to the production of such a flat steel product.

A flat steel product according to the invention offers optimum economic benefit in the production of solar concentrators, wherein here again it should be stressed that the use according to the invention of the flat steel product according to the invention occurs in the finished re-rolled, i.e. not further mechanically finely machined, in particular unpolished, state.

The invention is based on the knowledge that a flat steel product surface has a highly directed reflection if the surface concerned has an extremely low surface roughness, the arithmetic mean roughness Ra of which is much lower than 0.1 µm.

In order to produce such a smooth surface achieving high gloss values, the invention proposes a rolling strategy which can be performed on conventional rolling stands but nevertheless leads to an ideally suited product. Here the method according to the invention is equally suited to the processing of flat steel products in carbon steel or stainless steel.

In the first work step a) of the method according to the invention flat steel product optimally hot- or cold-rolled to a thickness of up to 2.5 mm is provided, at least one of the surfaces of which has an arithmetic mean roughness Ra of less than 2.5 µm.

The primary material provided in this way, in particular supplied as a coil, is then cold-rolled in work step b) subject to at least the following provisos:

The cold-rolling takes place in a plurality of steps, i.e. in a plurality of rolling passes. The number of rolling passes performed depends here on the starting thickness and the final thickness required in each case. Typically when performing the method according to the invention at least ten rolling passes are necessary, wherein regularly at least twelve rolling passes are carried out.

The overall forming rate achieved through the cold-rolling is 75-90%. Based on a typical starting thickness of for example 2.5 mm the thickness of the strip obtained after cold rolling is accordingly in the range 0.625-0.25 mm. Here the flat steel products intended for forming into mirror elements for solar concentrator are cold rolled such that in the finish-rolled stated they are for example up to 0.4 thick.

The forming rate achieved during cold rolling drops from one rolling pass to the next. The cold rolling thus commences in the first rolling pass with a high forming rate, in particular of at least 20%. For each subsequent rolling pass a forming rate is then set that is lower than the one before.

Optimally here the forming rate is reduced by 5-10% at a time from rolling pass to rolling pass. This means that the forming rate in a respective rolling pass corresponds to 90-95% of the forming rate of the previous rolling pass. In the final rolling pass the flat steel product is then cold rolled with the lowest forming rate, in particular of less than 10%.

The forming rate e achieved in the respective rolling pass n is calculated here as follows:

$$e_n[\%]=(De-Da)/De$$

where
De=thickness of the flat steel product before undergoing rolling pass n and
Da=thickness of the flat steel product after the respective rolling pass n The overall forming eg accordingly denotes the difference achieved over the entire rolling process between the thickness De of the flat steel product before cold rolling and the thickness Da upon completion of cold rolling in relation to the thickness Da.

The rolling pressure is set as a function of the strength of the material processed so that in the first rolling pass it is 200-800 MPa and in the final rolling pass 1,000-4,000 MPa. For example, for an overall forming rate of 84% with a flat steel product, produced from a steel with material number 1.4301, the rolling pressure in the first rolling pass is 400 MPa and in the final rolling pass 1,600 MPa.

The cold rolling takes place with the addition of a rolling oil with a viscosity of 5-10 mm$^2$/s at 40° C.

The rolling speed during cold rolling is greater than 200 m/min. In this way, during the respective cold rolling pass an even oil film is maintained between the work rolls and the flat steel product.

In order to provide the flat steel product with the required minimal surface roughness, finally the cold rolling in the final rolling pass, optimally in the final four rolling passes, is performed with a work roll, the circumferential surface of which, coming into contact with the stock, has an arithmetic mean roughness Ra, which is below the mean roughness required for the respective surface of the flat steel product, typically of less than 0.01 μm. Here the work rolls can be exchanged repeatedly. Thus it may be practical to exchange the work rolls in the penultimate and fourth-last pass for specially prepared work rolls with a mean roughness Ra of 0.01 μm. The arithmetic mean roughness Ra of the work rolls used prior to the roll change can for example be in the range of 0.08 μm or less.

In practice the method according to the invention can be performed on a conventional 20-roll stand.

In work step c) the cold-rolled strip obtained undergoes a cold-rolled strip annealing treatment for the purposes of softening, performed for example in a conventional bright annealing unit. Here the annealing takes place under a protective gas atmosphere with a hydrogen content of more than 50 vol. %. Where the flat steel product is made from a stainless steel, having a Cr content of more than 10.5 wt. %, the partial pressure ratio here of water vapour to hydrogen should be $p(H_2O)/P(H_2)<10^{-4}$, while for a Cr content of the steel of up to 10.5 wt. % a partial pressure ratio of $(H_2O)/P(H_2)<10^{-3}$ is sufficient.

In work step d) the flat steel product annealed and cold rolled according to the invention is for example re-rolled in a two-high rolling stand in one or more, in particular two, rolling passes. The forming rate achieved during this re-rolling is 0.5-2%. As usual, the purpose of the re-rolling is to eliminate a pronounced yield point which is present after the annealing treatment and which can cause so-called 'flow lines'. Here the re-rolling takes place dry, in order to achieve this effect at low forming rates. The two-high rolls are pre-ground and on their surface coming into contact with the stock typically have an arithmetic mean roughness Ra of less than 0.03 μm.

The flat steel product cold-rolled in the manner according to the invention has as such in the finished re-rolled state on at least one of its surfaces an arithmetic mean roughness Ra of less than 0.03 μm, in particular of less than 0.02 μm. Here, an essential characteristic of a flat steel product according to the invention is that the mean roughness Ra has a distinct preferred direction, aligned parallel to the direction of rolling. Thus with a finish re-rolled flat steel product according to the invention using topographic images the directions of rolling can be clearly identified.

It has surprisingly become apparent that a flat steel product can be produced according to the invention, which after re-rolling already has a gloss determined according to DIN 67530 of more than 1,200 gloss units and a directed reflection of more than 60%, wherein in practice a directed reflection of more than 80%, in particular more than 90%, is achieved. Flat steel products according to the invention thus have a reflectivity which is at least the same as the reflectivity of conventionally produced and polished flat steel products.

A further significant difference between a flat steel product according to the invention and a conventional cold-rolled and then polished flat steel product is that the polished flat steel product surface is clearly harder than the surface of a flat steel product according to the invention. For this reason on their reflective surface flat steel products according to the invention typically have a surface hardness of less than GPa in particular less than 3.5 GPa. This harder surface of flat steel products polished in a conventional manner can be explained by strain hardening of the surface caused by the polishing process, since the polishing only takes place after the recrystallization annealing.

In order to further increase the reflectivity a reflective coating system can be applied to the flat steel product produced and provided according to the invention.

The coating can be applied for example using vacuum metallisation methods, in particular in the continuous coating method. Here the coating comprises at least a reflective layer, which for example comprises one or more of the elements 'Al, Ag, Sn'. Thus the sheet can be coated with an Al—Ag alloy, with Sn, with an Sn—Al alloy or an Sn—Ag alloy. For the vapour deposition process PVD processes, magnetron sputtering, electron beam vapour deposition and similar can be used.

In order to give the surface of the flat steel product provided according to the invention serving as the reflection surface long-term stability against corrosion where necessary, alternatively or additionally to a coating to increase the reflectivity, an organic or inorganic coating can be applied to the flat steel product (top layer).

As inorganic coatings with a barrier effect by way of example $SnO_2$, $In_2O_3$, $Al_2O_3$, $SiO_2$, $TiO_2$, $ZrO_2$, but also amorphous coating systems such as glass comprising for example SiO$_2$/B$_2$O$_3$-borosilicate glass, SiO$_2$/P$_2$O$_5$-silicophosphate glass or B$_2$O$_3$/P$_2$O$_5$-borophosphate glass can be used. Here also the application can take place using PVD methods, preferably by sputtering or atomic layer deposition, but also using wet chemical methods, such as sol gel coatings by means of spin or dip coating.

Protective coatings involving spin-on glass systems as the top layer can also be considered, in which the organo-silicon or organo-boron compounds are initially applied using spin or dip coating and then subsequently thermally decomposed to form thick glass coatings. This method offers advantages in a potentially continuous coating using coil coating.

Hybrid coating systems such as Si:O:C:H-coatings (plasma polymers) applied using CVD methods can also be suitable.

Organic top layer coating systems comprising transparent lacquers similarly offer the possibility of continuous coating.

The top layer provided and applied in the manner described above provides protection not only against corrosion, but simultaneously against abrasive wear.

Figure 2:
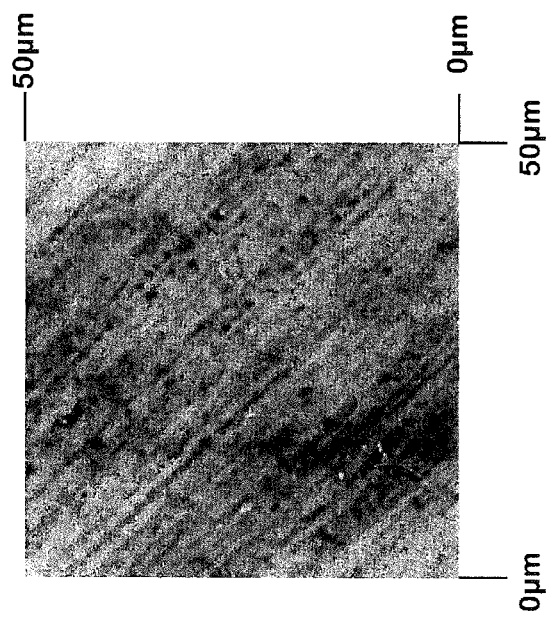
Figure 4:
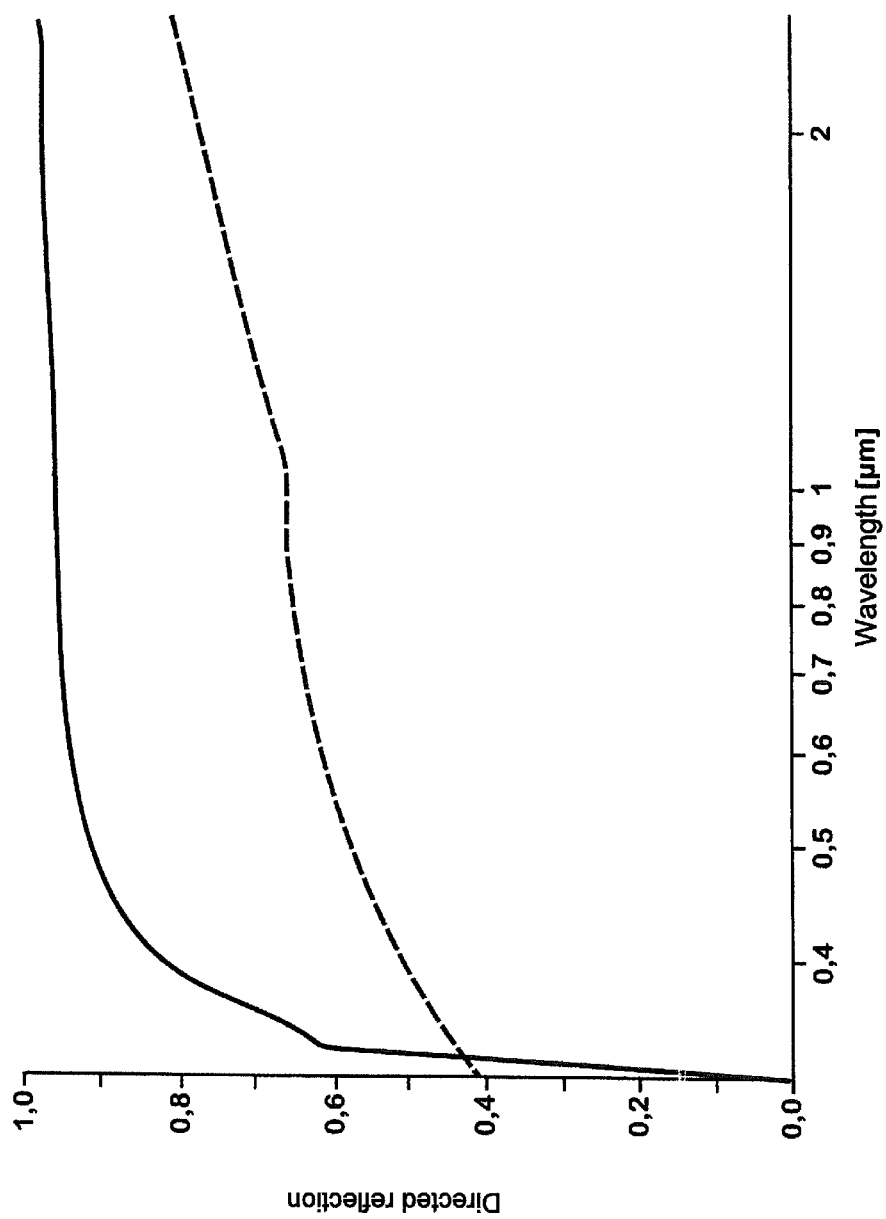
Figure 5:
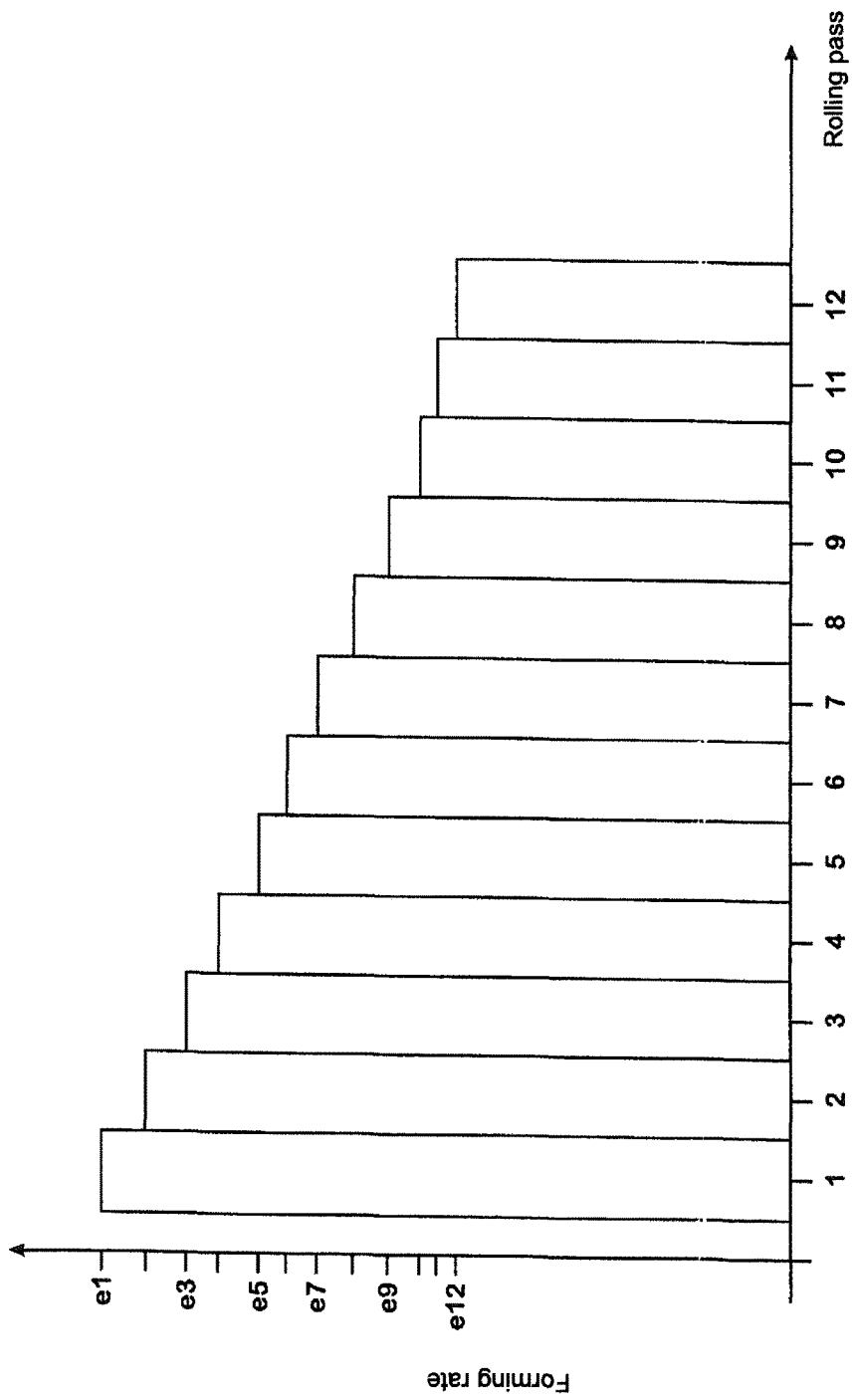

The invention is explained in more detail in the following using embodiments. These show as follows:

FIG. 1 a diagram, in which for three flat steel product specimens the directed reflection is applied in the solar spectral range over the wavelength;

FIG. 2 the surface topography of a flat steel product specimen rolled according to the invention;

FIG. 3 the surface topography of a polished flat steel product specimen;

FIG. 4 a diagram in which for a flat steel product specimen cold rolled according to the invention the directed reflection in the solar spectral range is applied over the wavelength in the pure cold-rolled state and after application of a coating;

FIG. 5 a schematic diagram of the pass schedule for the cold rolling undergone in producing flat steel product according to the invention.

For the production of a flat steel product for the manufacture of mirror elements for a solar concentrator in the form of a steel strip, a primary material in coil form was used, which was a hot-rolled, de-scaled hot-rolled strip. The 2.5 mm thick primary material comprised a standardised steel with material number 1.4301 and had an arithmetic mean roughness Ra determined according to DIN EN ISO 4287 of less than 2.4 µm.

The primary material was rolled on a 20-roll stand in twelve stages to a final thickness of 0.4 mm. The overall forming rate eg achieved was accordingly eg=(2.4−2)/2.4=83%.

In the first rolling pass a rolling took place with forming e1 of more than 20%. In the eleven subsequent passes the forming from pass to pass was reduced relatively by between 5% and 10%, so that in the final rolling pass of the cold rolling forming e12 of less than 10% was used for rolling (FIG. 5).

On their circumferential surface in contact with the flat steel product to be cold rolled, the work rolls had an arithmetic mean roughness Ra of 80 nm. For the ninth, tenth, eleventh and twelfth rolling passes the work rolls of the 20-roll stand were exchanged for specially prepared work rolls, the arithmetic mean roughness Ra of which was less than 10 nm.

During the twelve cold rolling passes the rolling pressure was an average of 1,600 MPa.

Each of the cold rolling steps was performed with the addition of a rolling oil, the viscosity of which was 8 mm$^2$/s at 40° C. In order to maintain a sufficient oil film between the work rolls and the flat steel product, rolling took place at a rolling speed of more than 200 m/min.

The cold-rolled flat steel product obtained in this way underwent a bright annealing treatment in a bright annealing unit under a protective gas atmosphere with a hydrogen content of more than 50%, wherein the partial pressure ratio of water vapour to hydrogen p(H$_2$0)/p(H$_2$) was less than $10^{-4}$.

Finally, the annealed cold-rolled strip was re-rolled dry, i.e. without oil or rolling emulsion, in a two-high rolling stand in two passes with a rolling force of 150 t. The circumferential surface of the two-high rolls in contact with the flat steel product had an arithmetic mean roughness Ra of 20 nm.

Table 1 gives the roughness values determined using atomic force microscopy for two flat steel product specimens according to the invention E1, E2, processed in the abovementioned way, the roughness values determined using white-light interferometry and the directed reflection in the state obtained after re-rolling. Table also provides for the purposes of comparison the corresponding values for a comparative sample V produced in a conventional manner and polished on its surface under investigation.

TABLE 1

|    | Roughness Ra [µm] White-light interferometry | Roughness Ra [µm] Atomic force | Directed reflectio Without coating |
|----|---|---|---|
| E1 | 0.023 | 0.012 | 63.3 |
| E2 | 0.015 | 0.012 | 64.4 |
| V  | —     | 0.004 | 65.4 |

The result of the measurement of the directed reflection in the solar spectral range is shown in detail in Figure (specimen E1: continuous line, specimen E2: broken line, comparative specimen V: continuous line). It can be seen that the specimens produced according to the invention after re-rolling and in the cold-rolled, unpolished state, already have a reflectivity that is essentially the same as the reflectivity of the comparative specimen produced with considerable effort initially by rolling and then polishing.

Clear differences between the flat steel products rolled according to the invention and the highly-polished specimen used for comparison in terms of roughness were verifiable. By means of topographic images (see FIG. 2) the rolling directions, in which the respective flat steel product was rolled, are clearly identifiable. Thus from FIG. 2 a preferred direction of the roughness characterised by a linear formation is detectable. With the polished specimen V used for comparison such a preferred direction is not present, however (FIG. 3).

In order to investigate how the refection capacity of the flat steel product specimens could be further increased by the application of a coating, electron beam vapour deposition was used to provide the flat steel product specimen E1 according to the invention with a 90-100 nm thick silver coating. As a result of this coating the directed reflection in the solar spectral range increased to approximately 93% and in doing so reached the order of magnitude of conventional glass mirrors. In FIG. 4 the reflectivity of the specimen E1 according to the invention before coating is shown by a broken line, while the reflectivity after coating is illustrated by a continuous line.

Finally, in a Nano-Indenter measurement, the hardness of the reflective surface of the specimens E1, E2 and V was investigated. Here the hardness of the polished comparative probe was clearly higher. The results of the measurements are summarised in Table 2.

TABLE 2

| Specimen | Hardness [GPa] | Reduced modulus of elasticity [GPa] |
|---|---|---|
| E1 | 3.8 +/− 0.6 | 179 +/− 26 |
| E2 | 3.6 +/− 0.3 | 171 +/− 15 |
| V | 5.0 +/− 0.2 | 202 +/− 8 |

The invention claimed is:

1. A flat steel product with high reflectivity, which in the finished re-rolled state on at least one of its surfaces has
an arithmetic mean roughness Ra of less than 0.03 μm with a preferred direction aligned parallel to the direction of rolling,
a gloss determined according to DIN 67530
of greater than 1,200 gloss units and
a directed reflection of greater than 60%.

2. The flat steel product according to claim 1, wherein on at least one surface it has an arithmetic mean roughness Ra of less than 0.02 μm with a preferred direction aligned parallel to the direction of rolling.

3. The flat steel product according to claim 1, wherein on at least one surface it has a surface hardness of less than 4 GPa.

4. The flat steel product according to claim 1, produced using a method comprising:

a) providing a starting flat steel product, at least one surface of which has an arithmetic mean roughness Ra of less than 2.5 μm;
b) cold rolling the starting flat steel product in a plurality of rolling passes,
wherein an overall forming rate achieved through the cold rolling is 75-90%,
the forming rate drops from rolling pass to rolling pass,
a rolling pressure in a first rolling pass is 200-800 MPa and a rolling pressure in a final rolling pass is 1,000-4,000 MPa,
the cold rolling takes place with an addition of rolling oil, a viscosity of which is 5-10 mm$^2$/s at 40° C.,
a rolling speed during the cold rolling is greater than 200 m/min, and
the cold rolling, at least in the final rolling pass, takes place with a work roll having a circumferential contact surface that has an arithmetic mean roughness Ra of less than 0.01 μm to obtain a cold-rolled flat steel product;
c) annealing the obtained cold-rolled flat steel product under a protective gas atmosphere with a hydrogen content of more than 50 vol. % to obtain an annealed flat steel product; and
d) dry re-rolling the annealed flat steel product with a degree of re-rolling of 0.5-2% to obtain the flat steel product.

5. The flat steel product according to claim 1, wherein it is made from a stainless steel with a Cr content of at least 10.5 wt. %.

6. A mirror element for solar concentrators comprising a flat steel product according to claim 1.

* * * * *